United States Patent [19]
Lowe

[11] Patent Number: 6,008,734
[45] Date of Patent: Dec. 28, 1999

[54] METHOD AND SYSTEM FOR DIMINISHING PHASE SHIFT BETWEEN TWO SIGNALS

[75] Inventor: Gregory D. Lowe, Dallas, Tex.

[73] Assignee: ADC Telecommunications, Inc., Minnetonka, Minn.

[21] Appl. No.: 08/946,760

[22] Filed: Oct. 9, 1997

[51] Int. Cl.[6] ........................................................ H04L 7/00
[52] U.S. Cl. ...................... 340/825.2; 710/101; 710/102; 713/400; 713/500; 713/503
[58] Field of Search ........................... 340/825.2; 327/41, 327/55, 141, 215, 228, 472; 375/293; 395/281, 282, 283; 710/101, 102, 126, 128, 129; 713/400, 500, 503

[56] References Cited

U.S. PATENT DOCUMENTS 5,862,350  1/1999  Coulson ................................. 395/283
5,870,570  2/1999  Chambers et al. ...................... 395/293
5,875,307  2/1999  Ma et al. ............................... 395/281

*Primary Examiner*—Michael Horabik
*Assistant Examiner*—Jean B. Jeanglaude
*Attorney, Agent, or Firm*—Schwegman, Lundberg, Woessner and Kluth

[57] ABSTRACT

The apparatus includes a plurality of components, including a first component, a center component, a component adjacent to the center component, and a last component. The apparatus also includes a first signal source generating a first signal, and a second signal source generating a second signal. The second signal source is separated by one or more components from the first signal source. A first bus couples the first signal source to the plurality of components. A second bus couples the second signal source to the plurality of components. The first and second signals are distributed substantially in-phase to the components.

18 Claims, 1 Drawing Sheet

METHOD AND SYSTEM FOR DIMINISHING PHASE SHIFT BETWEEN TWO SIGNALS

FIELD OF THE INVENTION

The present invention generally relates to electrical technology and, more specifically, to a method and system for diminishing phase shift between two signals.

BACKGROUND OF THE INVENTION

Electrical systems, such as communications systems, may use a timing source to generate a clock signal to synchronize the electrical system. Some electrical systems employ two timing sources, a working timing source and a protect timing source. The protect timing source is used by the electrical system, for example, when the working timing source becomes disabled.

While the electrical system is operational, it is desirable to seamlessly transition between the working and protect timing sources. However, if the clock signals from the working and protect timing sources are not substantially in phase, operation of the electrical system may be disrupted when transitioning between the two timing sources. For example, when a high data rate communications system transitions between the working and protect timing sources that do not have substantially in-phase clock signals, electrical system components, such as phase lock loops, may lose phase lock. As a result, a communications system may suffer from bit errors, including dropped frames.

This problem is particularly of concern in electrical systems in which the clock signals from the working and protect timing sources are distributed to different modules in a rack of the electrical system. The clock signals must be delivered in phase lock to each module to diminish bit error rates.

In one type of electrical system, the clock signals are serially coupled to each component. A conventional electrical system comprises working and protect tiing sources and components, such as slots. The working and protect timing sources respectively generate working and protect clock, or timing, signals. Modules may be inserted into the slots. The slots, and any modules inserted into the slots, are respectively coupled by first and second buses to the working and protect timing sources.

Each slot is typically coupled to the working and protect timing sources by segments of the first and second buses having different electrical lengths. As a result, the working and protect clock signals on the first and second buses are typically distributed out of phase to each module. In other words, a phase shift, or skew, between the working and protect clock signals typically arises at each module.

Furthermore, when inserted into a slot, each module capacitively loads the first and second buses. The capacitive loading arises because of capacitances at module terminals are coupled to the first and second buses. The capacitive loading typically aggravates the phase shift between the working and protect clock signals at each slot when differing electrical lengths of segments of the first and second buses connect a slot respectively with the working and protect timing sources. The increased phase shift, due to the capacitive loading, is dependent on the number and locations of the modules inserted into the slots of the electrical system. As a result, the phase of the clock signals from the working and protect timing sources may be further skewed. Hence, the likelihood that the operation of the electrical system will be disrupted is increased. Therefore, there is a need to maintain phase lock between the signals of the working and protect timing sources.

SUMMARY

The present invention solves the above-mentioned problems in the art and other problems which will be understood by those skilled in the art upon reading and understanding the present specification. The present invention provides a method and system for diminishing phase shift between working and protect timing sources in an electrical system.

The apparatus includes a plurality of components, including a first component, a center component, a component adjacent to the center component, and a last component. The apparatus also includes a first signal source generating a first signal, and a second signal source generating a second signal. The second signal source is separated by one or more components from the first signal source. A first bus couples the first signal source to the plurality of components. A second bus couples the second signal source to the plurality of components. The first and second signals are distributed substantially in-phase to the components.

In one embodiment, the first and second timing sources are respectively working and protect timing sources. In yet another embodiment, the components are slots. In yet another embodiment, the first and second buses each comprise a linear bus and a serpentine bus.

The method comprises the step of generating a first clock signal from a first signal source. A second clock signal is generated from a second signal source. The first clock signal propagates along a linear bus to a component. The second clock signal propagates along a serpentine bus to the component. The first and second clock signals arrive substantially in-phase at the component.

In one embodiment, the method further comprises the step of using the first clock signal in the component while the first clock signal is enabled. In yet another embodiment, the second clock signal is used in the component, rather than the first clock signal, when the first clock signal becomes disabled.

DETAILED DESCRIPTION OF THE EMBODIMENTS

Figure 1:
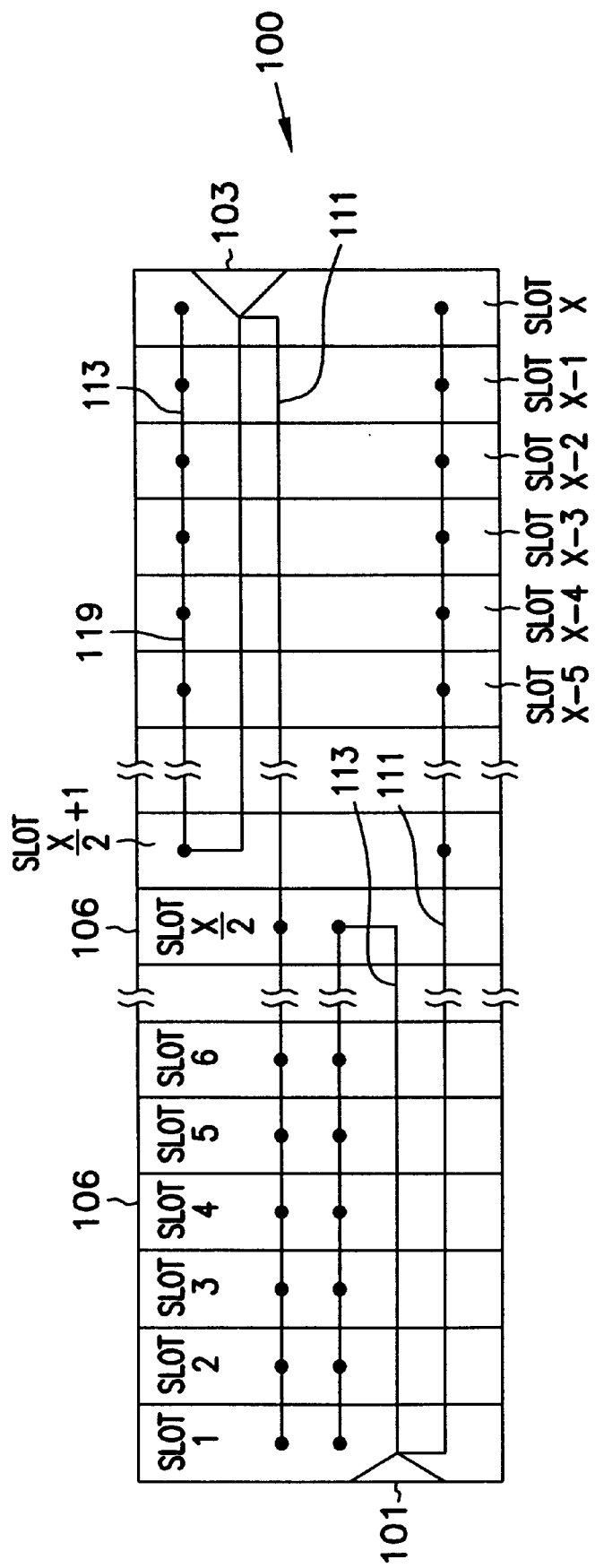
FIG. 1 illustrates one embodiment of the present invention.

In the following detailed description of the preferred embodiments, reference is made to the accompanying drawings which form a part hereof and in which is shown by way of illustration specific preferred embodiments in which the invention may be practiced. These embodiments are described in sufficient detail to enable persons skilled in the art to practice the invention, and it is to be understood that other embodiments may be utilized and that logical, mechanical and electrical changes may be made without departing from the scope of the present invention. The following detailed description is, therefore, not to be taken in a limiting sense.

FIG. 1 illustrates one embodiment of the present invention that comprises an electrical system 100 having working and protect timing, or signal, sources 101, 103 in modules, respectively inserted into slots 1 and X, that are not proximate to one another. Interspersed between th working and protect timing sources 101, 103 are X-2 slots 106 into which modules may be inserted. A combination of linear and serpentine buses 111, 113 couple the working and protect timing sources 101, 103 to each slot 106, as illustrated in FIG. 1. The serpentine buses 113 fold back upon themselves. In this sense, the term serpentine bus includes, but is not limited to, a bus which is configured to carry a timing signal to a point on the backplane of the electrical system 100 such that the timing signal can be fed to at least half of the slots 106 of the electrical system 100 over a segmented bus in a direction generally toward the slot 106 holding the module with the timing source that generates the timing signal. The first half of the slots 106, e.g., slots I through X/2, are serially coupled to the working timing source 101 by a serpentine bus 113. Slots 1 through X/2 are serially coupled to the protect timing source 103 through a linear bus 111. Also, slots X/2+1 through X are serially coupled to the working timing source 101 through a second linear bus 111. Slots X/2+1 through X are serially coupled to the protect timing source) 103 through a second serpentine bus 113. Slot X/2+1 is known as a center slot. Slot X/2 is known as a slot adjacent to the center slot. Slot X is known as a last slot. Slot 1 is known as the first slot. If the number of slots 106 is odd, the serpentine bus 113 may turn at the center slot or at the slot 106 adjacent to the center slot. As a result of this configuration, the corresponding electrical lengths of segments 119 of the linear and serpentine buses 111, 113 connecting the working and protect timing sources 101, 103 to any slot 106 are substantially equivalent.

Because the electrical lengths of segments 119 of the linear and serpentine buses 111, 113 coupling the working and protect timing sources 101, 103 to any slot 106 are substantially equivalent, the working and protect clock signals will arrive substantially in-phase at each slot. Thus, for example, the signals from the working and protect timing sources 101, 103 arrive at slot 5 substantially in phase. Furthermore, for this same reason, the capacitive loading will not substantially aggravate the phase skew between the working and protect clock signals at any slot 106.

Conclusion

The present invention provides a method and system for diminishing phase shift between the signals in an electrical system. It is an advantage of the present invention that the electrical system is not disrupted during a transition between the working and protect timing source because their signals are substantially in phase.

It is understood that the above description is intended to be illustrative, and not restrictive. Many embodiments will be apparent to those skilled in the art upon reviewing the above description. For example, the electrical system 100 may be a control or computer system. The electrical system 100 may be implemented as a rack with slots 106 into which modules may be inserted. Alternatively, the electrical system 100 may be implemented on an integrated system with fixed components.

What is claimed is:

1. An apparatus, comprising:
    a plurality of slots including a first slot, a center slot, a slot adjacent to the center slot, and a last slot;
    a first signal source generating a first timing signal;
    a second signal source, separated by one or more slots from the first signal source, generating a second timing signal;
    a first bus coupling the first signal source to the plurality of slots; and
    a second bus coupling the second signal source to the plurality of slots;
    wherein at least one of the first bus and the second bus includes a serpentine bus such that the first and second timing signals are distributed substantially in-phase to each of the slots.

2. The apparatus of claim 1, wherein the first and second signal sources are respectively working and protect timing sources.

3. The apparatus of claim 1, further including a plurality of modules, each of the modules being inserted in separate ones of the plurality of slots.

4. The apparatus of claim 3, wherein the first signal source is included in a first module of the plurality of modules, the first module being inserted in the first slot, and the second signal source is included in a last module of the plurality of modules, the last module being inserted in the last slot.

5. The apparatus of claim 1, wherein the first and second buses each comprise a linear bus and a serpentine bus.

6. The apparatus of claim 5, wherein the first bus comprises:
    a serpentine bus serially coupling the first signal source to slots from the first slot through the slot adjacent to the center slot;
    a linear bus serially coupling the first signal source to slots from the center slot through the last slot; and
    wherein the electrical lengths of the first bus from the first signal source to any particular slot, and of the second bus from the second signal source to the same particular slot are substantially equivalent.

7. The apparatus of claim 6, wherein the second bus comprises:
    a second serpentine bus serially coupling the second signal source to slots from the center slot through the last slot; and
    a second linear bus serially coupling the second signal source to slots from the first slot through the slot adjacent to the center slot.

8. The apparatus of claim 7, wherein the apparatus is a communications system.

9. An apparatus, comprising:
    a rack comprising a plurality of slots including a first slot, a center slot, a slot adjacent to the center slot and a last slot;
    a first module inserted into the first slot, wherein the first module includes a first signal source generating a first timing signal;
    a second module inserted into the last slot, wherein the second module includes a second signal source generating a second timing signal;
    a first bus coupling the first timing source to the plurality of slots;
    a second bus coupling the second timing source to the plurality of slots; and
    wherein at least one of the first bus and the second bus includes a serpentine bus such that the first and second signals are distributed substantially in-phase to the plurality of slots.

10. The apparatus of claim 9, wherein the first and second signal sources are respectively working and protect timing sources.

11. The apparatus of claim 9, further comprising a module inserted into a slot.

12. The apparatus of claim 9, wherein the first and second buses each comprise a linear bus and a serpentine bus.

13. The apparatus of claim 12, wherein the first bus comprises:
    a serpentine bus serially coupling the first signal source to slots from the first slot through the slot adjacent to the center slot;

a linear bus serially coupling the first signal source to slots from the center slot through the last slot; and wherein the electrical lengths of the first bus from the first signal source to any particular slot, and of the second bus from the second signal source to the same particular slot are substantially equivalent.

14. The apparatus of claim 13, wherein the second bus comprises:

a second serpentine bus serially coupling the second signal source to slots from the center slot through the last slot; and a second linear bus serially coupling the second signal source to slots from the first slot through the slot adjacent to the center slot.

15. The apparatus of claim 14, wherein the apparatus is a communications system.

16. A method, comprising the steps of:

generating a first clock signal from a first signal source;

generating a second clock signal from a second signal source;

propagating the first clock signal along a linear bus to a slot;

propagating the second clock signal along a serpentine bus to the slot, wherein the first and second clock signals arrive substantially in-phase at the slot.

17. The method of claim 16, further comprising the step of using the first clock signal in a module inserted into the slot while the first clock signal is enabled.

18. The method of claim 17, further comprising the step of using the second clock signal in the module inserted into the slot, rather than the first clock signal, when the first clock signal becomes disabled.

* * * * *

UNITED STATES PATENT AND TRADEMARK OFFICE
CERTIFICATE OF CORRECTION

PATENT NO.      : 6,008,734
DATED           : December 28, 1999
INVENTOR(S)     : Gregory D. Lowe It is certified that error appears in the above-identified patent and that said Letters Patent is hereby corrected as shown below:

<u>Title page,</u>
Item [22], please replace "Filed: Oct. 9, 1997" with -- Filed: Oct. 8, 1997 --

Signed and Sealed this

Twenty-eighth Day of October, 2003

JAMES E. ROGAN
*Director of the United States Patent and Trademark Office*